June 2, 1931.  A. D. ROBBINS  1,808,511
FRICTION DISK
Filed July 14, 1928
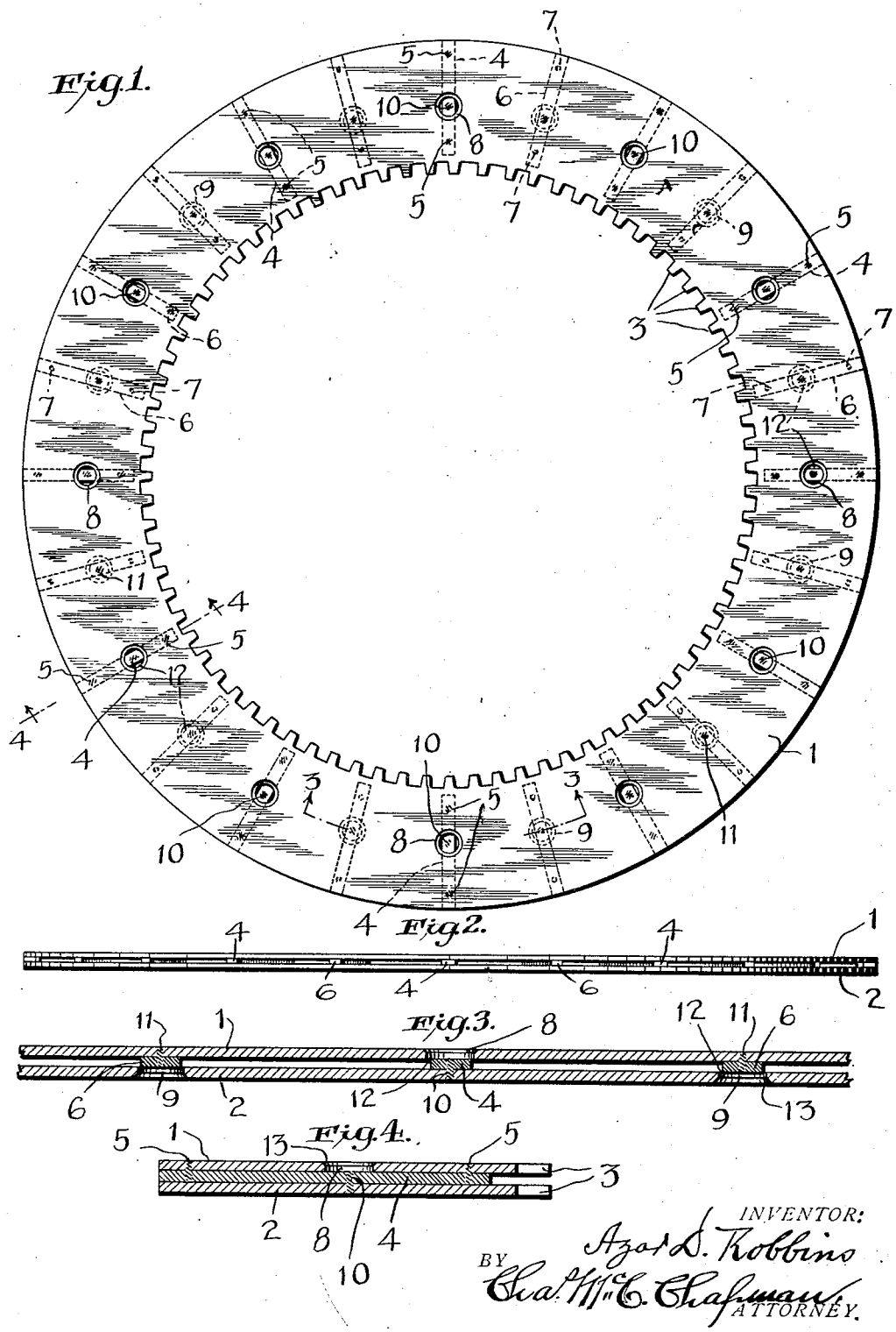
INVENTOR:
Azel D. Robbins
BY
Chas. M. C. Chapman
ATTORNEY.

Patented June 2, 1931

1,808,511

UNITED STATES PATENT OFFICE

AZOR D. ROBBINS, OF NEW YORK, N. Y., ASSIGNOR, BY MESNE ASSIGNMENTS, TO MECHANICAL DEVELOPMENT CORPORATION OF AMERICA, A CORPORATION OF DELAWARE

FRICTION DISK

Application filed July 14, 1928. Serial No. 292,726.

This invention has reference to the art of friction producing media, and particularly relates to friction disks for brakes and clutches, and for use as washers, thrust collars, and in various places and for the many uses to which such media can be adapted.

Among the objects of my invention may be noted the following: To provide a friction disk for brakes and clutches which can be economically and rapidly produced and which is strong and durable and capable of resisting very high pressures; to provide a disk of the nature indicated so constructed as to insure the free flow of lubricating and cooling fluids through the same so as to prevent overheating during use; to provide a duplex disk the parts of which are held rigidly and immovably together and in such manner as to prevent them from flexing, warping or bending and which, as a whole, can be made comparatively light and yet withstand tremendous pressure.

With the foregoing objects in view, and others which will be detailed during the course of this description, my invention consists in the parts, features, elements and combinations thereof hereinafter described and claimed.

In order that my invention may be clearly understood, I have provided drawings wherein:

Figure 1 is a face view of a duplex brake disk embodying my invention;

Figure 2 is an edge view thereof;

Figure 3 is an enlarged sectional view taken on the line 3—3 of Figure 1; and

Figure 4 is a cross-sectional view taken on the line 4—4 of Figure 1.

Referring to the drawings, it will be seen that my duplex disk consists of two thin rings 1 and 2 of any predetermined diameter, connected rigidly together to produce a single pressure receiving and transmitting disk of desired thickness and weight. The inner edges of the rings 1 and 2 are provided with teeth 3 adapted to interact with similar teeth or projections on a rotary or other member, according to the use of the disks. The teeth 3 may be located on the circumference of the disks; or other engaging means may be provided.

The rings 1 and 2 are spaced apart to enable the free flow of lubricant and cooling fluid, by means of a plurality of rectangular bars 4 and 6 equidistantly arranged between the rings and in radial manner. Preferably, the bars are arranged equally on the rings 1 and 2 and are welded thereto, as at 5 and 7, viz., bars 4 are welded to ring 1 at 5, and bars 6 are welded to ring 2 at 7. Each of the rings is also provided with openings, those in ring 1 being at 8, and those in ring 2 being at 9. When the rings are placed together, the bars thereof are arranged alternately and equidistantly apart and are welded to the respective rings, as at 10 and 11, through said openings 8 and 9. In this manner the bars 4 are also welded to ring 2, and the bars 6 are also welded to ring 1. This produces a very rigid, strong and durable duplex disk capable of withstanding great pressure without warping or flexing.

The holes 8 and 9 are slightly greater in diameter than the width of the bars 4 and 6, respectively, thus providing small passages 12 through which lubricant can reach the faces of the disks. The holes 8 and 9 are rounded, chamfered or countersunk at 13 to eliminate rough edges, thus preventing the rims of the holes from scratching or abrading the surfaces of friction disks arranged cooperatively and alternately with the duplex disks.

The number of bars 4 and 6 is not of the essence of my invention. They will be as numerous and as large as may be required, dependent upon the size of the disks and the work to be done. In thickness, the bars may vary considerably, it being a prerequisite that they shall hold the rings sufficiently far apart for cooling and lubricating purposes and yet avoid breaking or bending strains thereover when great pressure is imposed thereon for braking, driving or clutch purposes. In length the bars should extend from the circumference of the rings to approximately the base of the gear or teeth thereon so as to give as much support as possible to the rings transversely. The outer faces of the disks will be buffed or made smooth to avoid unequal strains and unbalanced pressure thereon.

For purposes of demonstrating my invention, I have shown the bars 4 and 6 welded in spots 5, 7, 10 and 11 to the respective rings so as to make my duplex disk; but, it is to be understood that said bars can be welded over a greater surface thereof and of the rings in order to produce a homogeneous structure which cannot be disintegrated regardless of length, character or location of use.

Having thus described my invention, what I claim and desire to secure by Letters Patent is:

1. A new article of manufacture comprising a plurality of rings each having openings therein arranged circularly thereof and equidistantly apart, and bars for securing the rings together face to face and capable of holding them apart and each crossing an opening and adapted to permit fluid circulation through the openings and around said bars.

2. A new article of manufacture comprising two annular plates, each having a plurality of rectangular bars extending transversely thereof, and a plurality of openings alternating with said bars, said plates being arranged face-to-face with their bars between them and in alternation and with the bars extending, respectively, across the plate openings, the width of the bars being less than the diameter of the openings to permit free circulation of fluids.

AZOR D. ROBBINS.